Patented July 2, 1946

2,403,343

UNITED STATES PATENT OFFICE 2,403,343

COMPOSITION OF MATTER AND METHOD OF MAKING SAME

Melvin De Groote, University City, Mo., assignor to Petrolite Corporation, Ltd., Wilmington, Del., a corporation of Delaware No Drawing. Original application December 10, 1943, Serial No. 513,783. Divided and this application July 26, 1944, Serial No. 546,743

7 Claims. (Cl. 260—406)

This invention relates to a new chemical product or compound, and to the manufacture of same, my present application being a division of my co-pending application Serial No. 513,783, filed December 10, 1943.

One object of my invention is to provide a new chemical product or compound, that is particularly adapted for use as a demulsifier for crude oil emulsions, but which is also capable of various other uses.

Another object of my invention is to provide a practicable method for manufacturing said new chemical product or compound.

Demulsification, as contemplated in the hereto appended claims, includes the preventive step of commingling the demulsifier with an aqueous component, which would or might subsequently become either phase of the emulsion, in absence of such precautionary measure.

Although one of the primary objects of my invention is to provide a new compound or composition of matter, that is an efficient demulsifier for crude oil emulsions of the water-in-oil type, said new compound or composition of matter has other uses, as hereinafter explained, and it may have additional uses in various other fields which have not yet been investigated.

The compounds herein contemplated as such, and particularly as demulsifiers, consist of reaction products derived by the oxyalkylation of the drastically-oxidized reaction product of a member of the group consisting of ricinoleic acid, polyricinoleic acid and their esters, with a member of the group consisting of aldehydes and ketones. Such oxidation is accomplished by means of an oxygen-containing gas.

The reaction between unsaturated fatty acids, hydroxy fatty acids, unsaturated hydroxy fatty acids and their esters, on the one hand, and aldehydes and ketones, on the other hand, appears to be one of acetalization. As to the manufacture of acetals of ricinoleic acid, castor oil, diricinoleic acid, polyricinoleic acid, and the like, reference is made to the process described in detail in German Patent No. 226,222, dated September 27, 1910, to Farbwerke Vorm. Meister Lucius & Bruning in Hochst A. M. It is known that an acetal type product of hydroxylated unsaturated fatty acids, as exemplified by ricinoleic acid, is susceptible to gaseous oxidation with the production of a resultant product of desirable characteristics. I have found that valuable compounds may be obtained by oxyalkylation of such drastically-oxidized products, and that such oxyalkylation derivatives are especially suitable for demulsification of crude oil emulsions of the water-in-oil type.

Attention is directed to the various aldehydes indicated in said aforementioned patent as being suitable for use in the process therein described. I have found that the lower molecular weight aldehydes, such as formaldehyde, acetaldehyde, butyraldehyde, and the like, to be the most desirable. One may, of course, employ hydroxyaldehydes, such as aldol or cyclic aldehyde, such as benzaldehyde, furfuraldehyde, etc. Generally speaking, my preference is to use formaldehyde. Furthermore, it is known that ketones, particularly the simpler ketones, such as acetone, ethyl methyl ketone, diethyl ketone, and the like, will also produce acetals, but with lower yields and slower reaction velocity than aldehydes. Thus, although ketones, particularly acetone, may be employed, it is decidedly more advantageous to use an aldehyde, particularly formaldehyde.

ACETYL-TYPE PRODUCT

Example 1

A kilogram of ricinoleic acid is treated with 250–500 grams of 40% formaldehyde solution, adding the formaldehyde solution little by little at 20° C., and stirring while the addition takes place. When all the aldehyde solution is added, the mixture is saturated with hydrochloric acid gas. The saturated mass is stirred for approximately 24–48 hours, adding additional hydrochloric acid, so that a maximum amount is present at all times. At the end of this reaction period, the reaction product is stirred with an equal volume of a solution of sodium sulfate of approximately 10% strength. The mixture is allowed to separate and the aqueous portion withdrawn. The acetal product is then given two subsequent washes with hot water, so as to remove all or substantially all traces of hydrochloric acid. The product is then heated to a temperature of about 70° C. and dried carbon dioxide gas passed through to remove any remaining traces of hydrochloric acid, as well as any moisture which may be present. The product thus obtained may be conveniently designated as an acetal of ricinoleic acid.

ACETYL-TYPE PRODUCT

Example 2

Castor oil is substituted for ricinoleic acid in the previous example. Needless to say, in the presence of hydrochloric acid, at least part of the oil is decomposed into ricinoleic acid or polyricinoleic acid. Possibly, during the hydrolytic step, monoricinolein or diricinolein is also formed. Furthermore, it may be that the glycerol liberated forms an acetal-type complex product with one or more of the previously indicated ricinoleic acid bodies and the reactant, formaldehyde.

ACETYL-TYPE PRODUCT

*Example 3*

Acetone is substituted for formaldehyde in Example 1.

ACETYL-TYPE PRODUCT

*Example 4*

Acetone is substituted for formaldehyde in Example 2.

In many instances, acetalization or condensation involving a methylene bridge can be accomplished more readily by means of trioxane, rather than formaldehyde, or some other formaldehyde polymer. The reaction rate can be controlled to a marked degree by varying the amount of catalyst, such as aluminum chloride, zinc chloride, etc. See Chemical & Engineering News, August 10, 1943, page 1250.

It will be noted that the products of the kind previously described have been referred to as acetals or acetal-type. A study of the reaction involving formaldehyde and ricinoleic acid, under conditions described, indicates that the alcoholic hydroxyl disappears to a greater or lesser degree, and apparently, the product formed is an acetal, which may be indicated in a general way by the following formula:

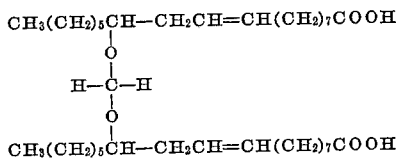

The central methylene radical naturally is a residual radical derived from formaldehyde; and in event some other aldehyde would be employed, the residual radical would be

in which R represents the hydrocarbon or hydroxy hydrocarbon radical derived from the aldehyde employed, such as acetaldehyde, aldol, crotonaldehyde, etc. Similarly, if a ketone would be employed, the central radical would appear thus:

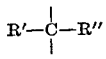

in which R' and R'' represent radicals derived from the ketone employed, such as methyl radicals, ethyl radicals, etc.

However, it is probable that even when one starts with ricinoleic acid, actually the dibasic acid produced by the formation of the acetal combines with the unreacted hydroxy acid, such as ricinoleic acid, and that actually one might build up a more complex structure than the simple one indicated above. Furthermore, reference to the aforementioned German patent reveals the fact that such procedure, i. e., the reaction with an aldehyde, such as formaldehyde, in presence of a strong mineral acid, such as hydrochloric acid, or sulfuric acid, may take place with an ordinary unsaturated fatty acid, such as oleic acid. Without attempting to point out hypothetical reactions by which such reactions can take place, it is sufficient to indicate that if one assumes a hypothetical hydration of oleic acid, it simply means a conversion into hydroxystearic acid; and naturally, in view of what has been said previously, a saturated hydroxy acid would react to form an acetal just as readily as an unsaturated hydroxy fatty acid.

Another explanation is that a hydrogen atom attached to a carbon atom immediately adjacent to an ethylene linkage is activated by such ethylene linkage, and thus, becomes reactive under the conditions described. Plausibility is lent to this explanation by the somewhat analogous reaction between maleic anhydride and oleic acid, without involving the ethylene linkage of the oleic acid. Further emphasis is suggested by the fact that this last mentioned reaction appears to take place more readily with linoleic acid than with oleic acid. The structure of linoleic acid suggests the mutual activation of the hydrogen atoms of the methylene radical situated between the 2-ethylene radicals. However, a consideration of what has just been said indicates that one cannot rule out the possibility that some further complex reactions may take place in the reaction of ricinoleic acid with acetal-forming compounds, for example, in such a manner as to involve the ethylene linkage. For these reasons, it is obvious that one cannot indicate the exact nature of the chemical compounds or compositions of matter obtained, and that one must describe them in terms of the method of manufacture. Thus, the most convenient terminology is that usually employed, to wit, to refer to the products as acetals or reaction products of the acetal type. To indicate those obtained by means of aldehydes, they will be referred to as acetals of aldehydes; and those obtained by means of ketones will be referred to as ketone acetals. Because of the exact nature of the final reaction product is not known, more properly the compositions can be designated as the reaction product of unsaturated hydroxy fatty acid bodies of high molecular weight with ketones or aldehydes, which are acetal-forming compounds containing a reactive carbonyl group.

OXIDIZED ACETAL-TYPE FATTY ACID COMPOUNDS

My preferred reactant is obtained by subjecting a material such as that derived in the manner described under Example 1, above, to the action of ordinary undried air at a temperature of about 110–125° C. for approximately 25–50 hours, in the absence of a catalyst, until the product reaches the maximum viscosity which is possible just short of the gelation point. If desired, the acidity of the final product may be removed by esterification with an alcohol, such as ethyl alcohol, propyl alcohol, ethylene glycol, glycerol, benzyl alcohol, or cyclohexanol; or it may be removed with a suitable basic material, such as an alkali, including ammonia, or an amine, such as triethanolamine, benzylamine, cyclohexylamine, amylamine, etc. This final step is obviously of general applicability.

Acetal-type products, as exemplified by Example 1, or Example 3, may be esterified in a conventional manner with an alcohol of the kind indicated above prior to oxidation. If desired, one may oxidize products exemplified by Examples 2 and 4, preceding.

It has previously been indicated that it is impossible, even to characterize properly and completely the acetalized product obtained in the manner indicated, even prior to any subsequent chemical reaction step by structural formulae. As is well known, it is impossible to indicate the composition of blown triricinolein, even when the composition of the raw material involved is known. Of course, chemical characteristics, as indicated by various chemical indices, such as saponification value, hydroxyl value, iodine number, etc., are well known in regard to conventional blown oils; but the composition of the actual constituents is not known. Similarly, in the present instance, not knowing the exact composition of the raw material which is subjected to drastic gaseous oxidation, one cannot indicate by chemical formulae the composition of the resultant product. Thus, the intermediate reactions herein contemplated must, of necessity, be characterized in terms of the method of manufacture, for the simple reason that no other suitable means is available.

Attention is directed to the fact that the manufacture of drastically-oxidized acetals or acetal-like material, and particularly those derived from ricinoleic acid compounds, are described in U. S. Patent No. 2,281,316, dated April 28, 1942, to Mace. They are referred to as "Viscous, non-gelatinized products formed by oxidizing with an oxygen-containing gas the reaction product of a member of the group consisting of ricinoleic acid, polyricinoleic acid and their esters with a member of the group consisting of aldehydes and ketones." My present invention is concerned primarily with subjecting such oxidation derivatives to oxyalkylation and employing the latter as demulsifiers.

Having obtained the oxidized reaction products of the acetal type or condensation type in the manner indicated, the next step is to subject such reaction products to the action of an olefine oxide containing a reactive ethylene oxide ring.

As typical examples of applicable oxyalkylating compounds may be mentioned glycerine epichlorhydrin, glycide alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

It is well known if triricinolein, preferably in the form of castor oil, is treated with an oxyalkylating agent, particularly ethylene oxide, propylene oxide, butylene oxide, glycidol, or the like, and if one employs a large molecular proportion of the oxyalkylating agent for each mole or occurrence of the ricinoleyl radical, that one can convert castor oil into a water-soluble product. The conventional procedure is well known, and generally speaking, involves nothing more nor less than heating castor oil in the presence of successive small amounts of alkylene oxide or the like, under comparatively low pressures and fairly low temperatures, and usually in the presence of an alkylene catalyst, as, for example, sodium ricinoleate. The temperatures employed are generally above 100° C. and below 200° C. The pressures employed are generally above 100 lbs. gauge, and below 300 lbs. gauge pressure. Sometimes oxyalkylation is conducted in a continuous manner by introduction of the ethylene oxide in a gaseous state. More frequently, and most conveniently, the oxide is introduced in a liquid form in a comparatively small amount, for instance, 300 lbs. of castor oil and 30 lbs. of ethylene oxide, along with approximately one pound of sodium ricinoleate. Reaction is allowed to take place under pressure in the manner above described until all of the ethylene oxide is absorbed. Another portion of ethylene oxide is added, and the procedure repeated until water solubility is obtained. Not infrequently as many as 30 lb. moles of the oxyalkylating agent are employed for one pound mole of tricinolein, in order to obtain complete water solubility. Needless to say, ethylene oxide promotes solubility in lower molecular proportions than propylene oxide or butylene oxide. Furthermore, ethylene oxide is preferable, due to its greater reactivity.

Furthermore, one can oxyalkylate a blown castor oil just as readily as unoxidized castor oil. See U. S. Patent No. 2,307,494, dated January 5, 1943, to De Groote & Keiser.

I have found that if one oxyalkylates an oxidized acetal of the kind described so as to introduce 3 to 20 ether linkages for each acyl radical, one obtains a product which has particular merit as a demulsifier and also utility in other arts. This is particularly true in the more highly oxyalkylated forms, that is, the type which show complete water solubility.

In the manufacture of such oxyalkylated, oxidized acetals, I prefer, for the sake of convenience, to consider the molecular weight of the oxidized acetal the same as if it were the original unmodified fatty material. This is not strictly correct, but insofar that the reactions which take place are only partially understood, and since the ratio of reactants is not critical, it appears to be entirely justified. The following are examples of my new chemical product or compound:

COMPOSITION OF MATTER

*Example 1*

One pound mole of ricinoleic acid is converted into an acetal in the manner described under the sub-heading "Acetal-type product, Example 1," preceding. The acetal is then oxidized in the manner described immediately preceding, under the heading "Oxidized acetal-type fatty acid compounds." The oxidized acetal is reacted with 3 pound moles of ethylene oxide in the presence of one-half of 1% of sodium stearate as a catalyst. The temperatures employed are approximately 120° C. to 200° C. The pressures employed are between 100 lbs. gauge pressure and 300 lbs. gauge pressure. The time required may vary from 3 to 12 hours, depending upon speed of agitation, etc.

COMPOSITION OF MATTER

*Example 2*

Oxidized acetals obtained similarly by oxidation of acetals, as described under the heading "Acetal-type product, Example 2," "Acetal-type product, Example 3," and "Acetal-type product, Example 4," and especially "Acetal-type product, Example 5" are substituted for the oxidized acetal employed in the preceding example. The ratio of ethylene oxide per acyl radical, to wit, the 3 to 1 ratio, is maintained.

COMPOSITION OF MATTER

*Example 3*

The same procedure is followed as in Examples 1 and 2, preceding, except that 6 lb. moles of ethylene oxide are employed instead of 3 lb. moles.

COMPOSITION OF MATTER

*Example 4*

The same procedure is followed as in Examples 1 and 2, preceding, except that 9 lb. moles of ethylene oxide are employed instead of 3 lb. moles.

COMPOSITION OF MATTER

Example 5

The same procedure is followed as in Examples 1 and 2, preceding, except that 15 lb. moles of ethylene oxide are employed instead of 3 lb. moles.

COMPOSITION OF MATTER

Example 6

The same procedure is followed as in Examples 1 and 5, preceding, except that propylene oxide is substituted for ethylene oxide.

Materials of the kind herein contemplated are useful as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles, such as sewage, coal washing waste water, and various trade wastes, and the like; as germicides, insecticides, emulsifiers for cosmetics, spray oils, water-repellent textile finish, etc. These uses are by no means exhaustive.

However, the most important use of the new chemical products herein described, is as demulsifiers for water-in-oil emulsions, and more specifically, emulsions of water or brine in crude petroleum.

I have found that the chemical compounds or reagents herein described, which are particularly desirable for use as demulsifiers, may also be used as a break inducer in doctor treatment of the kind intended to sweeten gasoline. See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote & Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote & Keiser.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials herein described.

I desire to point out that the superiority of the new demulsifier herein described is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In using my new composition of matter for resolving oil field emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

A somewhat analogous use of my demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

The new compounds herein described are of utility, not only for the purposes specifically enumerated in detail, but also find application in various other industries, processes, and for various uses where wetting agents of the conventional type are used. As to some of such uses which are well known, see "The expanding application of wetting agents," Chemical Industries, volume 48, page 324 (1941).

See my co-pending application Serial No. 513,782, filed Dec. 10, 1943, in which acetalized ricinoleic acid compounds are subjected to oxyalkylation and employed for various purposes, including demulsification of crude oil emulsions. I am aware that the therein described oxyalkylated products may be subjected to drastic gaseous oxidation, i. e., blowing with air or the like, so as to yield products which are different in nature from those enumerated in either my aforementioned co-pending application, or the present application, and yet equally satisfactory for the various purposes herein enumerated.

Having thus described my invention, what I claim as new and desire to secure by Letters Patent is:

1. A new composition of matter, consisting of an oxyalkylated, oxidized resultant of the acetalization reaction product of a member of the group consisting of ricinoleic acid, polyricinoleic acid and their esters, with a member of the group consisting of aldehydes and ketones; said oxidized product, prior to oxyalkylation, being a viscous, non-gelatinized product formed by oxidizing by an oxygen-containing gas, with the proviso that said oxyalkylated resultant have three to twenty ether linkages for each acyl radical.

2. In the manufacture of the new reaction product described in claim 1, the steps of: (A) Acetalizing a member of the group consisting of ricinoleic acid and polyricinoleic acid with a member of the group consisting of aldehydes and ketones; (B) Drastically oxidizing said acetalized product by means of an oxygen-containing gas; and (C) Oxyalkylating said drastically-oxidized product, with the proviso that said oxyalkylated resultant have 3 to 20 ether linkages for each acyl radical.

3. The composition of matter, described in claim 1, wherein said composition is water-insoluble.

4. The composition of matter, described in claim 1, wherein said composition is water-insoluble, and the oxyalkyl radicals are oxyethyl radicals.

5. A new composition of matter, consisting of a water-soluble, oxyethylated, oxidized resultant of the acetalization product of ricinoleic acid with a member of the group consisting of aldehydes and ketones; said oxidized product, prior to oxyethylation, being a viscous, non-gelatinized product formed by oxidizing by an oxygen-containing gas, with the proviso that said oxyethylated resultant have 3 to 20 ether linkages for each acyl radical.

6. A new composition of matter, consisting of a water-soluble, oxyethylated, oxidized resultant of the acetalization product of polyricinoleic acid with a member of the group consisting of aldehydes and ketones; said oxidized product, prior to oxyethylation, being a viscous, non-gelatinized product formed by oxidizing by an oxygen-containing gas, with the proviso that said oxyethylated resultant have 3 to 20 ether linkages for each acyl radical.

7. A new composition of matter, consisting of a water-soluble, oxyethylated, oxidized resultant of the acetalization product of ricinoleic acid esters with a member of the group consisting of aldehydes and ketones; said oxidized product, prior to oxyethylation, being a viscous, non-gelatinized product formed by oxidizing by an oxygen-containing gas, with the proviso that said oxyethylated resultant have 3 to 20 ether linkages for each acyl radical.

MELVIN DE GROOTE.